(No Model.)

E. D. MISNER.
WHEEL.

No. 528,785. Patented Nov. 6, 1894.

Witnesses
H. G. McMillan
Donald C. Ridout

Inventor
E. D. Misner
by C. H. Riches
his atty

UNITED STATES PATENT OFFICE.

EDGAR DESCUM MISNER, OF BRANTFORD, ASSIGNOR OF ONE-HALF TO WILLIAM H. HANES, OF LYNDEN, CANADA.

WHEEL.

SPECIFICATION forming part of Letters Patent No. 528,785, dated November 6, 1894.

Application filed December 8, 1893. Serial No. 493,195. (No model.)

*To all whom it may concern:*

Be it known that I, EDGAR DESCUM MISNER, machinist, of Brantford, in the county of Brant and Province of Ontario, Canada, have invented certain new and useful Improvements in Wheels; and I hereby declare that the following description is sufficiently full, clear, and exact as to enable others skilled in the art to which it appertains to make and use the same.

The object of this invention is to devise a wheel in which the cost of manufacture and repair will be greatly reduced, and to so construct the wheel that it will resist a greater proportionate strain than those wheels now in use.

A further object of the invention is to reduce the friction between the wheel and the axle to a minimum, and also to so construct the wheel that its weight can be proportionately reduced.

To attain the foregoing results, the invention consists essentially in the construction, combination and arrangement of parts as will be hereinafter fully set forth and particularly pointed out in the claim.

Figure 1:
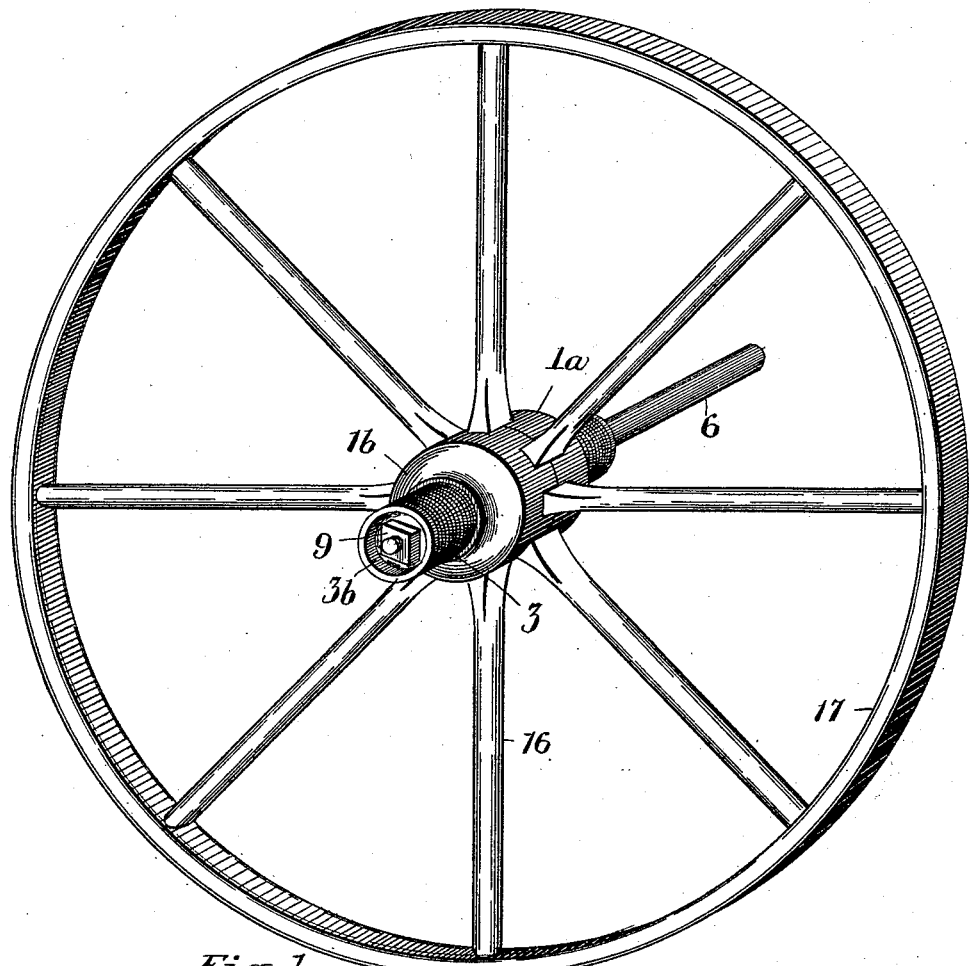
Figure 2:
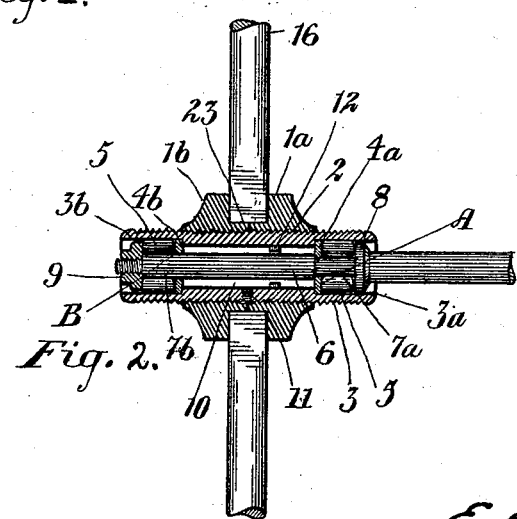

In the drawings, Figure 1 is a perspective view of a wheel embodying my invention. Fig. 2 is a vertical sectional view of the same.

Like numerals and letters of reference refer to like parts throughout the specification and drawings.

The wheel is composed substantially of two hub sections respectively $1^a$ and $1^b$. The bore 2 of each of the hub sections $1^a$ and $1^b$ is screw threaded and each of the hub sections is fitted on a metallic sleeve 3, screw threaded on its outer face to engage with the screw threaded bores of the said hub sections. The sleeve 3 serves also as the boxing for the hub sections $1^a$ and $1^b$. Within the sleeve 3 and at a suitable distance from the end $3^a$ is formed a shoulder $4^a$ and within the sleeve 3 at a suitable distance from the opposite end $3^b$ is a shoulder $4^b$. These shoulders $4^a$ and $4^b$ respectively form what might be termed the inner ends of the journal boxes respectively A and B. Passing through the sleeve 3 is the axle 6, and running upon the journals $7^a$ and $7^b$ of the axle 6 at each end of the sleeve 3 are roller bearings 5. Contiguous to the journal $7^a$ is the flange 8 formed integrally with the axle and slightly less in diameter than the inner diameter of the sleeve 3, in order that the sleeve 3 can turn freely around the said flange 8 which is located within the said sleeve. The flange 8 bears against one end of the roller bearings 5 running upon the journal $7^a$, while the opposite end of the said bearings turn against the shoulder $4^a$ of the sleeve 3. By means of this shoulder $4^a$ and the flange 8 the roller bearings 5 are secured in place. The one end of the roller bearings 5 running upon the journal $7^b$ turns against the shoulder $4^b$, while the opposite ends of the said roller bearings turn against a nut 9 screwed on the end of the axle 6 and located within the sleeve 3.

While I find it preferable to locate the flange 8 and nut 9 within the sleeve 3, I do not, however, confine myself to follow out this particular feature of the construction.

Formed within the sleeve 3 is a chamber 10 for the purpose of admitting oil to lubricate the journals $7^a$ and $7^b$ and roller bearings 5; the chamber 10, as shown in Fig. 2, is situated mediately between the ends of the sleeve 3, and is provided with a screw threaded plug 11. Within the sleeve 3 is a series of lugs or projections 12 which extend inwardly toward the center of the sleeve, but do not touch the axle when within the sleeve. The object of the projections 12 is for the purpose of holding a wrench or tool when fitted into the sleeve for the purpose of turning the sleeve when screwing on the hub sections $1^a$ and $1^b$.

As shown in Fig. 2 of the drawings the hub sections $1^a$ and $1^b$ are expanded from each other, and are fitted on the sleeve 3, on either side of the middle of the said sleeve.

It will be noticed that the wheel I have illustrated is what is commonly known as a wooden wheel, and that the hub sections $1^a$ and $1^b$ are adjacent or contiguous to each other, and that the spoke sockets 23 are formed in each of the sections $1^a$ and $1^b$ to receive the inner ends of the spokes 16. As shown in the drawings in this instance one half only of each spoke socket 23 is formed in each section $1^a$ and $1^b$, but I do, however, not confine myself to forming one half of the spoke socket in each section, as I may, if I so desire, make what is commonly known as a zig-zag wheel and form a complete socket in each of the said sections, and arrange the inner end of the spoke sockets alternately in each hub section, and it might here be stated that each spoke socket 23 is formed from the inner face of each of the sections 1ᵃ and 1ᵇ inwardly into each of the said sections, to permit of the inner end of each of the spokes 16 being readily placed therein. By constructing the hub in two or more sections and fitting them on a sleeve similiar to the one herein described, it is possible to separate the various sections and remove or replace one or more spokes without interfering with the remaining parts of the wheel. As shown in Fig. 2 the roller bearings 5 at the end 3ᵃ of the sleeve 3 are larger than the roller bearings at the opposite end 3 of the said sleeve. This construction is shown for the purpose of illustrating the fact that roller bearings of various sizes may be employed in connection with the same wheel, but I do not however confine myself to the use of any particular sized bearing, nor to any particular style of wheel.

Having thus fully described my invention, what I claim as new, and desire to secure by Letters Patent, is—

In a wheel, the combination of a sleeve having screw-threads upon its periphery, a hub mounted on said sleeve, said hub formed of two sections, recesses formed in the inner face of each of said sections, screw-threads formed within the bores of the sections, said screw-threads of the bores of each of the sections engaging the peripheral screw-threads of said sleeve, a rim, spokes having their outer ends secured to the said rim and their inner ends mounted in the recesses of the hub sections, an axle passing through the bore of the sleeve, said axle being of a less diameter than the diameter of the sleeve, journal boxes formed at each end of and within said sleeve, roller bearings disposed in said journal boxes, a chamber formed between the journal boxes and adapted to convey oil to lubricate the journals, a screw plug, 11, for said chamber, and inwardly-projecting lugs cast integral with, and disposed in the bore, of, the sleeve, said inwardly-projecting lugs adapted to be engaged by a tool for turning said sleeve when screwing on the hub sections; substantially as and for the purpose set forth.

Brantford, November 7, 1893.

EDGAR DESCUM MISNER.

Witnesses:
T. S. SHENSTN,
JOHN FOULDS.